(12) United States Patent
Kim et al.

(10) Patent No.: US 10,916,384 B2
(45) Date of Patent: Feb. 9, 2021

(54) FIBROUS ELECTRODE AND SUPERCAPACITOR USING SAME

(71) Applicant: IUCF-HYU (INDUSTRY-UNIVERSITY COOPERATION FOUNDATION HANYANG UNIVERSITY), Seoul (KR)

(72) Inventors: Seon Jeong Kim, Seoul (KR); Chang Soon Choi, Seoul (KR); Kang Min Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 58 days.

(21) Appl. No.: 16/118,608

(22) Filed: Aug. 31, 2018

(65) Prior Publication Data

US 2018/0374659 A1 Dec. 27, 2018

Related U.S. Application Data

(63) Continuation of application No. PCT/KR2016/005067, filed on May 13, 2016.

(30) Foreign Application Priority Data

Mar. 3, 2016 (KR) .......................... 10-2016-0025925

(51) Int. Cl.
*H01G 11/36* (2013.01)
*H01G 11/40* (2013.01)
(Continued)

(52) U.S. Cl.
CPC ............. *H01G 11/40* (2013.01); *H01G 11/28* (2013.01); *H01G 11/36* (2013.01); *H01G 11/46* (2013.01);
(Continued)

(58) Field of Classification Search
CPC ........ H01G 11/40; H01G 11/28; H01G 11/70; H01G 11/46; H01G 11/36; B82Y 40/00;
(Continued)

(56) References Cited

U.S. PATENT DOCUMENTS

| 8,470,221 B2 * | 6/2013 | Wei | ........................ B82Y 40/00 |
| | | | 264/172.11 |
| 9,242,443 B2 * | 1/2016 | Wei | ........................ B32B 37/14 |

(Continued)

FOREIGN PATENT DOCUMENTS

| JP | 5557992 B2 | 7/2014 |
| KR | 10-1219579 B1 | 1/2013 |

(Continued)

OTHER PUBLICATIONS

Tao Chen et al., "High-Performance, Stretchable, Wire-Shaped Supercapacitors," Angewandte Communications, Jan. 7, 2015, pp. 618-622, vol. 54, No. 2.
(Continued)

*Primary Examiner* — Nathan Milakovich
(74) *Attorney, Agent, or Firm* — Sughrue Mion, PLLC

(57) ABSTRACT

The present disclosure relates to a fibrous electrode and a supercapacitor including the same. In the fibrous electrode, a carbon nanotube sheet is spirally wound on a surface of an elastic fiber. Thus, the fibrous electrode may maintain a fiber shape, and an electrical connection structure in the carbon nanotube sheet may not be damaged by deformation of the elastic fiber. That is, the fibrous electrode may be reversibly changed to maintain excellent electrical conductivity. In
(Continued)

addition, the fibrous electrode has a fiber shape having a diameter of hundreds of micrometers, and thus the fibrous electrode may be light and may have excellent durability and excellent life span characteristics.

10 Claims, 6 Drawing Sheets

(51) Int. Cl.
    *H01G 11/46*     (2013.01)
    *H01G 11/70*     (2013.01)
    *H01G 11/28*     (2013.01)
    *B82Y 40/00*     (2011.01)
    *B82Y 30/00*     (2011.01)

(52) U.S. Cl.
    CPC .............. *H01G 11/70* (2013.01); *B82Y 30/00* (2013.01); *B82Y 40/00* (2013.01); *Y02E 60/13* (2013.01); *Y10S 977/742* (2013.01); *Y10S 977/755* (2013.01)

(58) Field of Classification Search
    CPC ..... B82Y 30/00; Y02E 60/13; Y10S 977/755; Y10S 977/742
    See application file for complete search history.

(56) References Cited

U.S. PATENT DOCUMENTS

| | | | |
|---|---|---|---|
| 9,453,118 B2 * | 9/2016 | Kim | D01D 1/02 |
| 9,514,892 B2 * | 12/2016 | Kim | H01G 11/24 |
| 9,523,162 B2 * | 12/2016 | Wei | D01D 5/24 |
| 10,106,420 B2 * | 10/2018 | Kim | D01D 1/02 |
| 10,176,934 B2 * | 1/2019 | Kim | H01G 11/36 |
| 10,446,330 B2 * | 10/2019 | Kim | H01G 11/26 |
| 10,483,050 B1 * | 11/2019 | Yu | H01G 11/08 |
| 2008/0170982 A1 * | 7/2008 | Zhang | B82Y 10/00 423/447.3 |
| 2018/0194102 A1 * | 7/2018 | Lima | C09J 7/38 |
| 2019/0006125 A1 * | 1/2019 | Kim | H01G 11/46 |
| 2020/0006014 A1 * | 1/2020 | Yu | H01G 11/36 |

FOREIGN PATENT DOCUMENTS

| | | |
|---|---|---|
| KR | 10-2013-0117538 A | 10/2013 |
| KR | 10-2014-0097252 A | 8/2014 |
| KR | 10-1544116 B1 | 8/2015 |
| KR | 10-2011-0107196 | 8/2016 |

OTHER PUBLICATIONS

Keyu Xie et al., "Materials and Structures for Stretchable Energy Storage and Conversion Devices," Advanced Materials, Jun. 11, 2014, pp. 3592-3617, vol. 26, No. 22.

Zhibin Yang et al., "A Highly Stretchable, Fiber-Shaped Supercapacitor," Angewandte Chemie International Edition, Dec. 9, 2013, pp. 13453-13457, vol. 52, No. 50.

Changsoon Choi et al., "Elastomeric and dynamic MnO2/CNT core-shell structure coiled yarn supercapacitor," Advanced Energy Materials, Jan. 11, 2016, pp. 1-8 (25 pages), vol. 6, No. 5.

Changsoon Choi et al., "Stretchable, Weavable Coiled Carbon Nanotube/MnO$_2$/Polymer Fiber Solid-State Supercapacitors," Scientific Reports, Mar. 23, 2015, pp. 1-6, vol. 5, No. 9387.

Xuli Chen et al., "A novel 'energy fiber' by coaxially integrating dye-sensitized solar cell and electrochemical capacitor," Journal of Materials Chemistry A, 2014, pp. 1897-1902, vol. 2.

International Search Report of PCT/KR2016/005067 dated Dec. 2, 2016.

* cited by examiner

[FIG. 1]
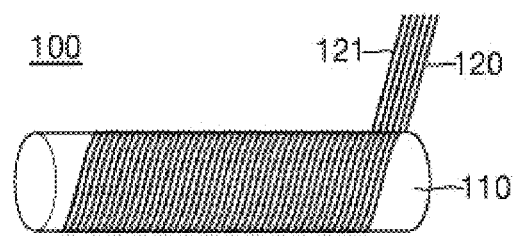

[FIG. 2]
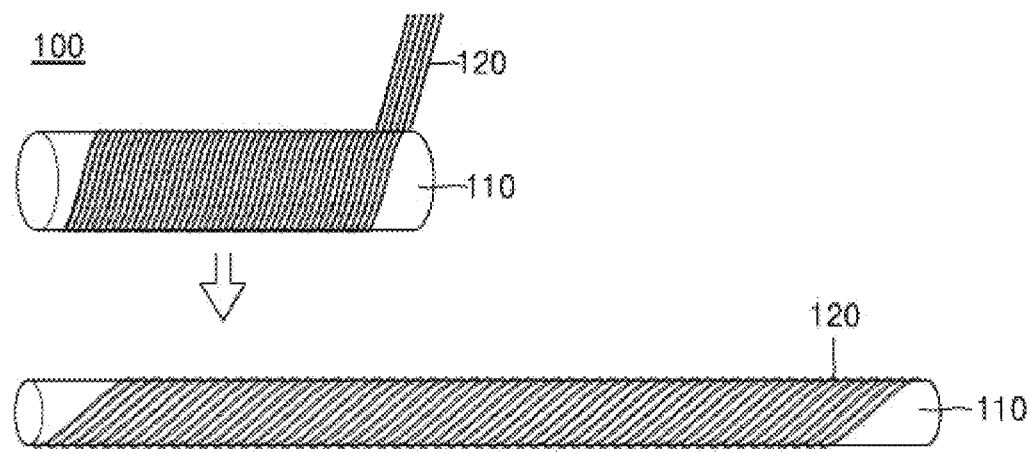

[FIG. 3]
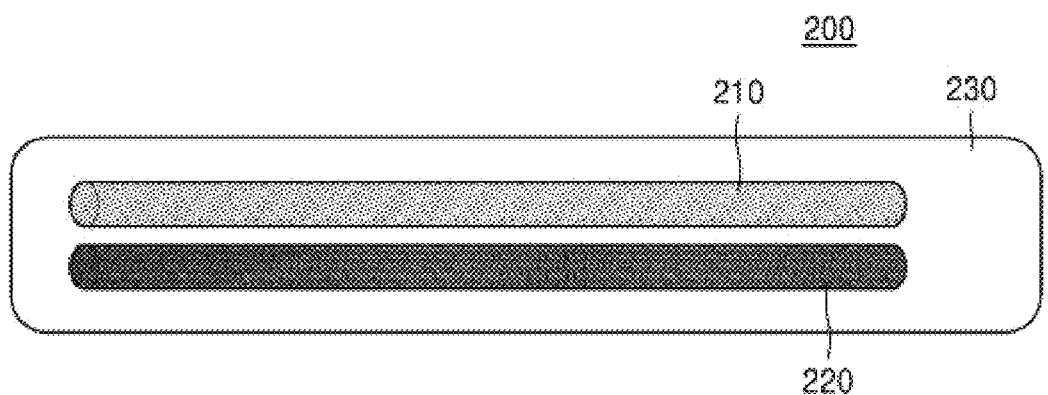

[FIG. 4]
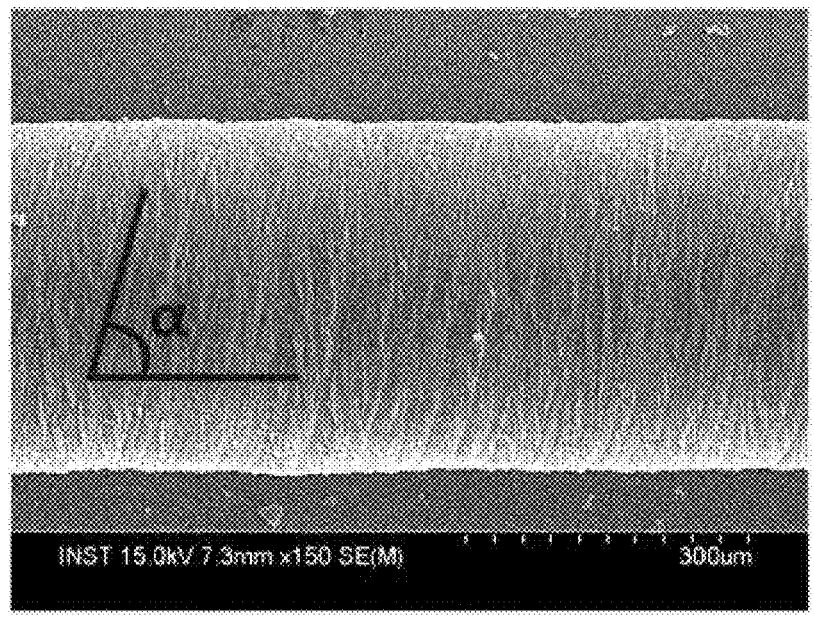

[FIG. 5]
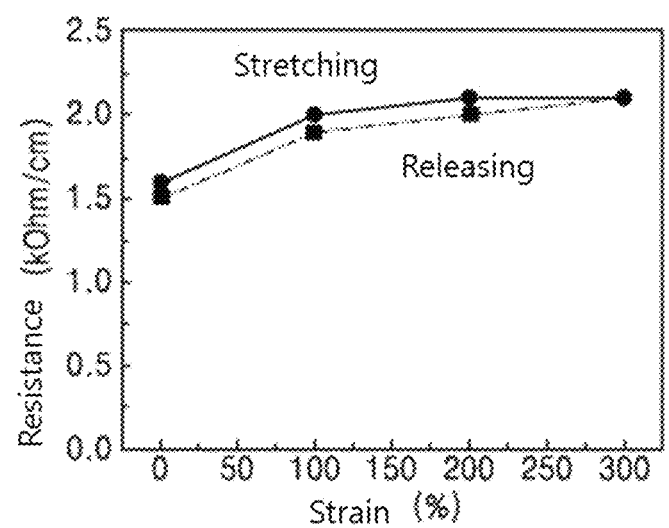

[FIG. 6]
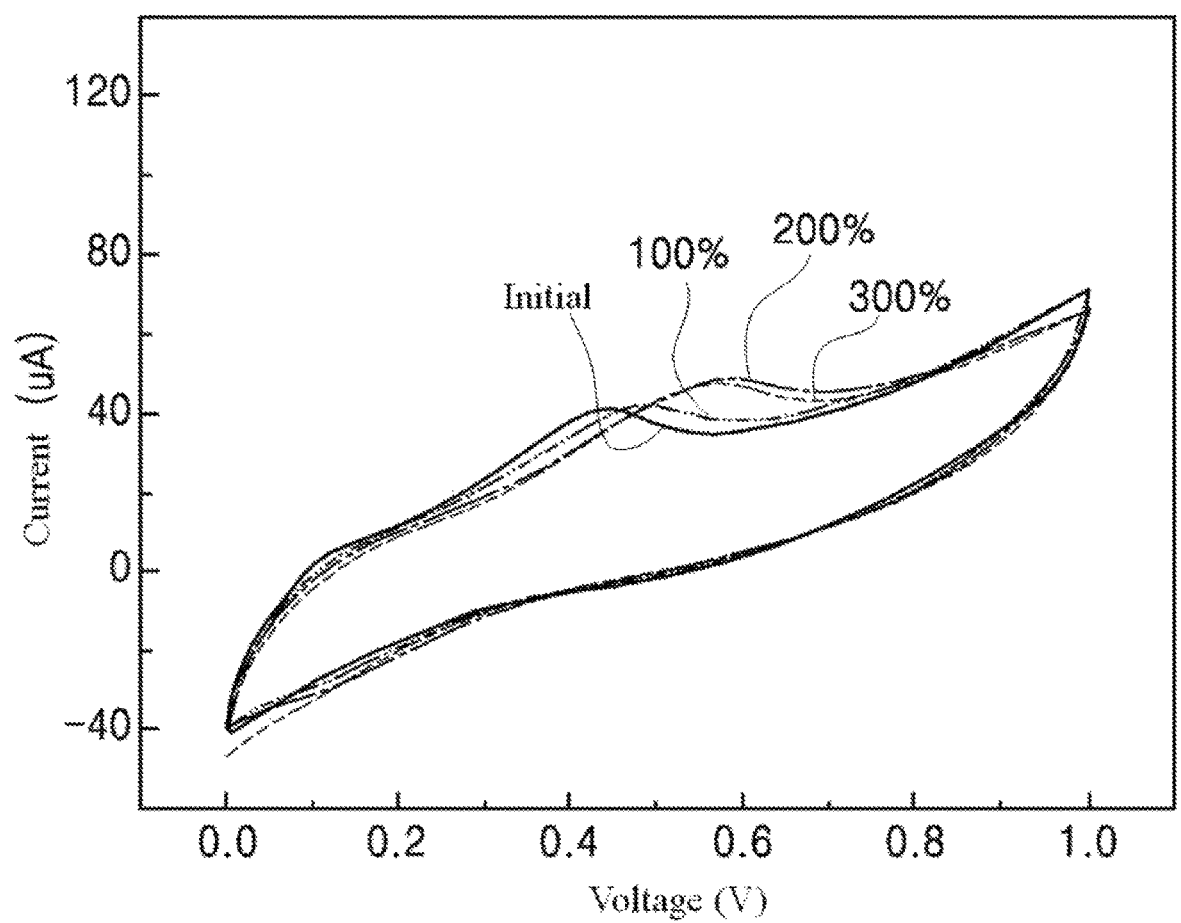

FIBROUS ELECTRODE AND SUPERCAPACITOR USING SAME

CROSS-REFERENCE TO RELATED APPLICATION

This application is a continuation of pending International Application No. PCT/KR2016/005067, which was filed on May 13, 2016 and claims priority to Korean Patent Application No. 10-2016-0025925, filed on Mar. 3, 2016, in the Korean Intellectual Property Office, the disclosures of which are hereby incorporated by reference in their entireties.

BACKGROUND

1. Field

The present disclosure herein relates to a fibrous electrode and a supercapacitor including the same, and more particularly, to a fibrous electrode which maintains excellent electrical conductivity in various deformations (e.g., bending or stretching), and a supercapacitor including the same.

2. Description of the Related Art

Generally, capacitors may store electrical energy. A supercapacitor may have a specific capacitance which is several thousand times greater than that of a conventional capacitor. The supercapacitor is spotlighted as a next-generation energy storage medium because of its high power density, high charging/discharging rates, environmental friendliness, long life span, and low cost per charge/discharge cycle.

Recently, electronic devices have been advanced to be used in various fields such as flexible displays, smart surgical instruments, smart clothing, dielectric elastomer actuators, smart glasses, smart watches, wearable computers, implantable medical devices, and microelectronic devices, and thus flexible electronic devices have been actively developed.

Therefore, to smoothly develop and use electronic devices, capacitors used as energy sources of the electronic devices should be flexible according to deformation of the electronic devices.

However, since the supercapacitor is generally formed by inserting a liquid electrolyte between a rigid metal layer and an electrode (e.g., carbon) on the rigid metal layer, flexibility of the supercapacitor may be significantly low. Thus, it is difficult to apply the supercapacitor to the electronic devices described above.

To solve the above limitation, a thread-shaped capacitor having flexibility have been developed. This relates to a supercapacitor which includes an electrolyte, and a positive electrode and a negative electrode formed by seed-growing a nanowire on a surface of a nanofiber. This supercapacitor has flexibility, durability, and a high specific capacitance, but performance of the supercapacitor may be deteriorated by various deformations (e.g., stretching in a longitudinal direction, bending, and twisting). Thus, application range of the supercapacitor is limited (patent document 1).

Thus, it is required to develop a fibrous electrode having a new structure, which is capable of solving the above limitations and of maintaining excellent battery performance in various deformations such as bending or stretching.

Patent document 1: Korean Patent Publication No. 10-2011-0107196

SUMMARY

The present disclosure may provide a fibrous electrode which has excellent variability or flexibility and is capable of maintaining its performance in various deformations, and a supercapacitor including the same.

In an aspect, a fibrous electrode includes an elastic fiber, and a carbon nanotube sheet that is formed on a surface of the elastic fiber and has at least one layer. The carbon nanotube sheet is spirally wound on the surface of the elastic fiber.

In an embodiment, the carbon nanotube sheet may be formed by uniaxially aligning at least one or more carbon nanotubes.

In an embodiment, a bias angle of the carbon nanotube sheet arranged with respect to an axial direction of the elastic fiber may range from 45 degrees to 85 degrees.

In an embodiment, the carbon nanotube sheet may be spirally wound in such a way that portions of the carbon nanotube sheet overlap with each other.

In an embodiment, a width of the overlapping portions of the carbon nanotube sheet may range from 0.1 time to 0.9 times a width of the carbon nanotube sheet.

In an embodiment, the carbon nanotube sheet may have a plurality of pores.

In an embodiment, the fibrous electrode may further include an electrode active material on a surface of the carbon nanotube sheet.

In an embodiment, the electrode active material may be an oxide (MeOx) including one metal (Me) selected from a group consisting of Si, Sn, Li, Al, Ag, Bi, In, Ge, Pb, Pt, Ti, Zn, Mg, Mn, Cd, Ce, Cu, Co, Ni, and Fe or may be one conductive polymer selected from a group consisting of poly(3,4-ethylenedioxythiophene), polyaniline, and polypyrrole.

In an embodiment, the fibrous electrode may have an elastic strain of 100% to 300%.

In another aspect, a supercapacitor includes at least one fibrous electrode described above.

In an embodiment, an electrical capacity per unit length of the supercapacitor may range from 0.1 mF/cm to 5 mF/cm.

BRIEF DESCRIPTION OF THE DRAWINGS

FIG. 1 is a perspective view showing a fibrous electrode according to an embodiment of the inventive concepts.

FIG. 2 is a perspective view showing a carbon nanotube sheet flexibly stretched as an elastic fiber is stretched in its axial direction, in a fibrous electrode according to an embodiment of the inventive concepts.

FIG. 3 is a perspective view showing a supercapacitor according to an embodiment of the inventive concepts.

FIG. 4 is a scanning electron microscope (SEM) image showing a fibrous electrode manufactured according to an embodiment 1 of the inventive concepts.

FIG. 5 is a graph showing an electrical resistance of the fibrous electrode according to the embodiment 1 after stretching the fibrous electrode by each of 100%, 200% and 300% in its axial direction, to check the influence of deformation of the fibrous electrode on electrical conductivity.

FIG. 6 is a graph showing a cyclic voltammetry curve of a supercapacitor of an embodiment 4 measured after stretching the supercapacitor by each of 100%, 200% and 300% in its axial direction, to check the influence of deformation of the supercapacitor on energy storage performance.

DETAILED DESCRIPTION OF THE EMBODIMENTS

Hereinafter, various aspects and various embodiments of the inventive concepts will be described in more detail.

A typical supercapacitor is hard and heavy and has no mechanical freedom (i.e., no variability or flexibility), and thus application field thereof is limited.

To solve these limitations, a supercapacitor using a fiber-shaped electrode has been developed to improve mechanical freedom. However, the supercapacitor has low flexibility and thus is difficult to be applied to a flexible electronic device. In addition, performances (e.g., electrical conductivity) of the supercapacitor are deteriorated when it is deformed. Due to these limitations, it is difficult to realize a supercapacitor having desired performances.

However, a fibrous electrode according to an embodiment of the inventive concepts may be manufactured by spirally winding a carbon nanotube sheet on a surface of an elastic fiber, and thus the carbon nanotube sheet may be induced to have a great bias angle on the surface of the elastic fiber. As a result, even though the fibrous electrode is deformed (e.g., stretched in its axial direction or bent), the carbon nanotube sheet may be deformed in the same direction as the fibrous electrode, and thus electrical conductivity of the fibrous electrode may be maintained constant without an increase in resistance.

In other words, the fibrous electrode according to an embodiment of the inventive concepts may include an elastic fiber, and a carbon nanotube sheet which is formed on a surface of the elastic fiber and has at least one layer. Here, the carbon nanotube sheet may be spirally wound on the surface of the elastic fiber. The structure of the fibrous electrode is shown in FIG. 1.

As shown in FIG. 1, the fibrous electrode 100 may include the carbon nanotube sheet 120 having at least one layer on the surface of the elastic fiber 110, and the carbon nanotube sheet 120 may be spirally wound on the surface of the elastic fiber 110.

In other words, the carbon nanotube sheet 120 in which carbon nanotubes 121 are uniaxially aligned may be spirally wound on the surface of the elastic fiber 110 in the fibrous electrode 100, and thus wrinkles may be formed at the carbon nanotube sheet 120. Thus, the fibrous electrode 100 may have a great surface area and a plurality of pores.

At this time, to increase bonding strength between the elastic fiber 110 and the carbon nanotube sheet 120 in the fibrous electrode 100, the elastic fiber 110 may be stretched by 0% to 50%, and then, the carbon nanotube sheet 120 may be spirally wound on the surface of the elastic fiber 110. If the carbon nanotube sheet 120 is wound after stretching the elastic fiber 110 by a percentage greater than 50%, an initial length of a manufactured electrode may be increased to reduce tensile strength of the electrode in its axial direction.

Here, the term 'spiral' may correspond to 'spiral' or 'helix'. In addition, the spiral shape may be a shape in which a component is twisted in a certain range, and the spiral shape may mean shapes similar to a shape of a general spring.

The elastic fiber 110 may include a polymer fiber having elasticity. For example, the elastic fiber 110 may include one selected from a group consisting of a polyurethane-based fiber, a polyolefin-based fiber, a polyester-based fiber, a polyamide-based fiber, a natural rubber-based fiber, a synthetic rubber-based fiber, a composite rubber-based fiber of natural rubber and synthetic rubber, and a combination thereof. In particular, the elastic fiber 110 may include one selected from a group consisting of polyurethane, nylon, silicon rubber, and a combination thereof, which are inexpensive and have excellent elasticity and durability.

The elastic fiber 110 may be a single fiber or a multi-fiber including one or more fibers.

A diameter of the elastic fiber 110 may range from 1 μm to 1000 μm. If the diameter of the elastic fiber 110 is less than 1 μm, it may be difficult to form the elastic fiber 110. If the diameter of the elastic fiber 110 is greater than 1000 μm, a thickness of the fibrous electrode 100 may be increased. Thus, there may be limitations in using the elastic fiber 100 having the diameter less than 1 μm or greater than 1000 μm in various electronic devices.

At least one or more carbon nanotubes 121 may be uniaxially aligned to form the carbon nanotube sheet 120. For example, the carbon nanotube sheet 120 may be formed by a drawing method from carbon nanotube forest vertically grown by a chemical vapor deposition (CVD) method.

In addition, the carbon nanotube sheet 120 may be spirally wound on the surface of the elastic fiber 110. In detail, the carbon nanotube sheet 120 may be wrapped around a circumference of the elastic fiber 110 in a left or right twisted shape. Here, a bias angle of the carbon nanotube sheet 120 arranged with respect to the axial direction of the elastic fiber 110 may range from 45 degrees to 85 degrees. If the bias angle is less than 45 degrees, sufficient variability or flexibility may not be provided when the fibrous electrode 100 is deformed, and thus a resistance of the fibrous electrode 100 may be increased when the fibrous electrode 100 is deformed, e.g., stretched in the axial direction, bent, or twisted. If the bias angle is greater than 85 degrees, movement distances of electrons in the carbon nanotube sheet 120 may be increased, and thus a resistance of the fibrous electrode 100 may be significantly increased. In particular, the bias angle may range from 75 degrees to 80 degrees. In this bias angle range, the fibrous electrode 100 may have the lowest resistance and excellent elasticity.

The carbon nanotube sheet 120 may be spirally wound in such a way that portions of the carbon nanotube sheet 120 do not overlap with each other, or in such a way that portions of the carbon nanotube sheet 120 overlap with each other.

When the carbon nanotube sheet 120 is spirally wound in such a way that the portions of the carbon nanotube sheet 120 do not overlap with each other, the portions of the spirally wound carbon nanotube sheet 120 may be spaced apart from each other by a distance which ranges from 0.1 time to 1 time a width of the carbon nanotube sheet 120.

However, when the portions of the carbon nanotube sheet 120 do not overlap with each other, elasticity may be excellent but an internal resistance may be increased. Thus, it is more preferable that the carbon nanotube sheet 120 is spirally wound in such a way that the portions of the carbon nanotube sheet 120 overlap with each other. A width of the overlapping portions of the carbon nanotube sheet 120 may range from 0.1 time to 0.9 times the width of the carbon nanotube sheet 120. If the width of the overlapping portions is less than 0.1 time the width of the carbon nanotube sheet 120, elasticity may be excellent but an internal resistance may be increased in stretching and contracting processes. If the width of the overlapping portions is greater than 0.9 times the width of the carbon nanotube sheet 120, a residual elongation may be greater than about 10% of an initial length before stretching, and thus elasticity may be lost.

Generally, when the fibrous electrode 100 is deformed, e.g., pushed, bent, twisted, folded, curved, or stretched in its longitudinal direction, stress may be applied to the carbon nanotube sheet 120, and thus there may be a high possibility that electrical connection is broken. However, when the carbon nanotube sheet 120 is wound on the surface of the elastic fiber 110 to have the bias angle in the range described above, the bias angle may be reversibly changed depending on the deformation of the fibrous electrode 100 as shown in FIG. 2, and thus mechanical stress applied in the axial direction may be relaxed to maintain excellent mechanical freedom and electrical conductivity without loss or breakage of electrical connection.

Here, the bias angle represents a grain direction of the carbon nanotube sheet 120, e.g., an arrangement state of the carbon nanotubes 121 in the carbon nanotube sheet 120. In other words, the bias angle means an arranged angle of the carbon nanotubes 121 with respect to the axial direction of the elastic fiber 110.

Since the carbon nanotube sheet 120 is arranged to have a certain bias angle with respect to the axial direction of the elastic fiber 110 as described above, the fibrous electrode 100 may obtain the surface which has variability or flexibility and is formed by wrapping of the aligned carbon nanotubes 121 of the carbon nanotube sheet 120.

The long carbon nanotubes 121 may be aligned to form the carbon nanotube sheet 120. Thus, when the carbon nanotube sheet 120 is spirally wound on the elastic fiber 110 to manufacture the fibrous electrode 100, the electrical connection may continue at the elastic fiber 110 along the axial direction without interruption, and thus excellent electrical conductivity may be secured.

In addition, since the carbon nanotube sheet 120 and the elastic fiber 110 are integrally deformed (e.g., bent, twisted, or stretched), the electrical connection may not be broken or separated. Thus, even though various deformations are provided to the fibrous electrode 100, the resistance of the fibrous electrode 100 may not be greatly increased. Furthermore, when the deformation is removed, the carbon nanotube sheet 120 may be rapidly restored to its initial state. Thus, even though the carbon nanotube sheet 120 is repeatedly stretched or deformed, the electrical conductivity of the carbon nanotube sheet 120 may not be reduced.

The fibrous electrode 100 can be deformed into various forms. In particular, when stretched in the axial direction, the fibrous electrode 100 may have an excellent elastic strain capable of being stretched by 0% to 300%. In particular, the fibrous electrode 100 may have an elastic strain of 100% to 300%. In more detail, it was confirmed that a resistance of the fibrous electrode 100 was increased by only about 0.3 times when the fibrous electrode 100 was stretched in its longitudinal direction by four or more times an initial length of the fibrous electrode 100. In addition, it was confirmed that the stretched length was restored to an original state and the resistance was restored to its initial state. Here, 'elasticity' means a phenomenon that an object is deformed by external force (stress) and the deformed object is restored to its original state when the external force is removed. Deformation caused at this time is referred to as elastic deformation. Thus, the elastic strain means a percentage (%) of a deformable length to a length of an initial fibrous electrode in a range in which the fibrous electrode does not lose 'elasticity' when external force is provided to the fibrous electrode in elastic behavior.

As used herein, the term 'elastic strain' may mean a strain at which a residual elongation of a fiber after removing tensile force becomes about 10% or less of an initial length of the fiber before stretching when the fiber is stretched and then is relaxed again.

In some embodiments, to improve electric storage characteristics, the fibrous electrode 100 may further include an electrode active material (not shown) on a surface of the carbon nanotube sheet 120. The electrode active material may be an oxide (MeOx) including one metal (Me) selected from a group consisting of Si, Sn, Li, Al, Ag, Bi, In, Ge, Pb, Pt, Ti, Zn, Mg, Mn, Cd, Ce, Cu, Co, Ni, and Fe or may be one conductive polymer selected from a group consisting of poly(3,4-ethylenedioxythiophene), polyaniline, and polypyrrole.

Since the electrode active material fills the plurality of pores formed in the carbon nanotube sheet 120 of the fibrous electrode 100, a contact area between the electrode active material and the carbon nanotube sheet 120 may be great and adhesive strength therebetween may be excellent. Thus, electric storage performance of the fibrous electrode 100 may be further improved.

The contact area between the carbon nanotube sheet 120 and the electrode active material may be increased by the plurality of pores formed in the carbon nanotube sheet 120, and thus the amount of moved ions may be increased and movement distances of the ions may be reduced. As a result, electrochemical energy storage performance of the fibrous electrode 100 may be significantly improved, as compared with a pore-free carbon fiber.

Referring to FIG. 2, when the elastic fiber 110 is stretched in its axial direction, the carbon nanotube sheet 120 wound on the surface of the elastic fiber 110 at the constant bias angle may be stretched in the axial direction. As a result, the electrical connection may not be damaged, and thus the excellent electrical conductivity may be maintained.

In more detail, the carbon nanotube sheet 120 may have a great bias angle before being stretched. When the fibrous electrode 100 is stretched, the bias angle may be reduced and the carbon nanotube sheet 120 may be lengthened in the axial direction. Thus, stress caused by deformation such as stretching may be relaxed.

As a result, the fibrous electrode 100 having the structure described above may have excellent performance and may be easily manufactured for a short manufacturing time. Thus, a cost of the fibrous electrode 100 may be very inexpensive.

Another aspect of the inventive concepts relates to a supercapacitor 200 which includes at least two fibrous electrodes 210 and 220 corresponding to the fibrous electrode described in the above embodiments. A structure of the supercapacitor 200 is shown in FIG. 3.

Referring to FIG. 3, the supercapacitor 200 may include two or more fibrous electrodes 210 and 220 described above. In this case, the two or more fibrous electrodes 210 and 220 may behave like one strand, and a structure thereof may be very stable.

In detail, the supercapacitor 200 of FIG. 3 may use two fibrous electrodes 210 and 220 as a first electrode 210 and a second electrode 220, respectively. In the supercapacitor 200, the first electrode 210 and the second electrode 220 may be disposed adjacent to each other under a condition that an electrical short does not occur between the first and second electrodes 210 and 220.

The first electrode 210 and the second electrode 220 may have a constant separation distance therebetween and may be parallel to each other. The separation distance may range from 0.01 µm to 100 µm. If the separation distance is less than 0.01 µm, an electrical short may occur. If the separation distance is greater than 100 µm, performance of the supercapacitor may be reduced or deteriorated.

In another example of the supercapacitor 200, the first electrode and the second electrode may be twisted together in a 2-ply structure. Here, the supercapacitor 200 may further include a separator disposed between the two fibrous electrodes 210 and 220 or on surfaces of the two fibrous electrodes 210 and 220 to prevent an internal short caused by contact between the two fibrous electrodes 210 and 220.

The supercapacitor 200 may include one electrolyte 230 selected from a group consisting of a liquid electrolyte, a gel-type polymer electrolyte, and a solid electrolyte. The electrolyte 230 may be, but not limited to, an electrolyte generally used in a supercapacitor. In some embodiments, the electrolyte 230 may include neutral polyvinylalcohol-lithium chloride (PVA-LiCl) or basic polyvinylalcohol-potassium hydroxide (PVA-KOH), which has an excellent capacitance.

Even though the supercapacitor 200 is variously deformed, e.g., bent, twisted, or stretched, an increase in resistance of the supercapacitor 200 may not be great. Thus, initial performance of the supercapacitor 200 may be maintained, and the supercapacitor 200 may be restored to an initial state without a loss.

In addition, an electrical capacity per unit length of the supercapacitor 200 may range from 0.1 mF/cm to 5 mF/cm. Thus, the energy storage performance of the supercapacitor 200 may be about 6 or more times greater than that of a typical fibrous supercapacitor manufactured using carbon nanotube and manganese dioxide.

EMBODIMENTS OF THE INVENTIVE CONCEPTS

The inventive concepts will be described more fully hereinafter with reference to the following embodiments. It should be noted, however, that the inventive concepts are not limited to the following embodiments. In addition, on the basis of the following embodiments, it will be apparent to those skilled in the art that various changes and modifications not suggesting experimental results may be made without departing from the spirits and scopes of the inventive concepts.

[Embodiment 1] Fibrous Electrode

First, a catalyst layer of 1 nm to 3 nm was coated on a silicon wafer by an electron-beam deposition process. This was inserted into a quartz tube furnace preheated at 700 degrees Celsius under a gas atmosphere in which argon of 750 sccm and hydrogen of 100 sccm were mixed with each other, and then, was maintained at the same temperature for 5 minutes. Subsequently, acetylene of 50 sccm was injected into the quartz tube furnace to form multi-walled carbon nanotube forest having a length of 400 μm or less and an outer diameter of 12 nm or less and consisting of 9 layers.

A multi-walled carbon nanotube sheet was drawn from a sidewall of the formed multi-walled carbon nanotube forest.

Next, a previously formed polyurethane fiber having an average diameter of 300 μm was stretched by 50% in its longitudinal direction, and then, both ends of the stretched polyurethane fiber were fixed.

To spirally wind the carbon nanotube sheet on a surface of the polyurethane fiber at a bias angle of 75 degrees, the carbon nanotube sheet was wound by rotating only the polyurethane fiber in a state in which the carbon nanotube sheet was fixed on the surface of the fixed polyurethane fiber to have the constant bias angle of 75 degrees.

[Embodiment 2] Fibrous Electrode

The polyurethane fiber was stretched by 0%, and then, both ends of the polyurethane fiber were fixed. Thereafter, the carbon nanotube sheet was spirally wound on the polyurethane fiber. Except for these features, other processes and other conditions of the embodiment 2 were the same as corresponding processes and corresponding conditions of the embodiment 1.

[Embodiment 3] Fibrous Electrode Including Electrode Active Material

To deposit manganese dioxide on a surface of the fibrous electrode manufactured in the embodiment 1, the fibrous electrode was cleaned with distilled water and then was dried. Thereafter, to perform an electrochemical deposition method, a three-electrode system was prepared. In the three-electrode system, a silver/silver chloride electrode was used as a reference electrode, a platinum electrode was used as a counter electrode, and the cleaned fibrous electrode was used as a work electrode.

An electrolyte solution and each of the electrodes were inserted into a reactor, and a voltage of 1.2V was applied with respect to the reference electrode for 15 seconds to manufacture an elastic fibrous electrode on which manganese dioxide was deposited.

0.02 M $MnSO_4.5H_2O$ and 0.2 M $Na_2SO_4$ were used as the electrolyte solution.

[Embodiment 4] Supercapacitor

Two fibrous electrodes manufactured in the embodiment 3 were disposed in parallel to each other and were coated with a solid electrolyte based on PVA-LiCl, thereby manufacturing a supercapacitor.

FIG. 4 is a SEM image showing the fibrous electrode manufactured according to the embodiment 1 of the inventive concepts. As shown in FIG. 4, a surface of the fibrous electrode of the embodiment 1 was formed by spirally winding the carbon nanotube sheet on the surface of the elastic fiber, and thus the carbon nanotube sheet was formed to have the bias angle α with respect to the axial direction of the elastic fiber.

FIG. 5 is a graph showing an electrical resistance of the fibrous electrode according to the embodiment 1 after stretching the fibrous electrode by each of 100%, 200% and 300% in its axial direction, to check the influence of deformation of the fibrous electrode on electrical conductivity.

As shown in FIG. 5, the fibrous electrode can be stretched in its axial direction by 100%, 200% and 300%, and an electrical resistance of the fibrous electrode is increased by about 0.3 times after the stretching. In addition, the resistance is restored to an initial value when the fibrous electrode is restored to its original state.

This means that electrical connection of the carbon nanotube sheet is not damaged and is capable of returning to an original state even though the fibrous electrode is stretched by 300% in its axial direction.

In other words, the fibrous electrode according to the embodiments of the inventive concepts may have excellent variability or flexibility and may maintain the electrical conductivity in various deformations.

FIG. 6 is a graph showing a cyclic voltammetry curve of a supercapacitor of an embodiment 4 measured after stretching the supercapacitor by each of 100%, 200% and 300% in its axial direction, to check the influence of deformation of the supercapacitor on energy storage performance.

As shown in FIG. 6, the energy storage performance of the supercapacitor manufactured in the embodiment 4 is 0.32 mF/cm at a charging rate of 100 mV/sec. In addition, the supercapacitor maintains the energy storage performance of about 95% or more even though it is stretched by 300% in its axial direction.

The fibrous electrode according to the embodiments of the inventive concepts may be capable of being variously deformed (e.g., bent or stretched) and of being realized in the form of textile. As a result, the fibrous electrode according to the embodiments of the inventive concepts may be applied to various electronic devices such as implantable medical devices, microelectronic devices, smart glasses, smart watches, wearable computers, and smart clothing.

The fibrous electrode according to the embodiments of the inventive concepts may include the carbon nanotube sheet spirally wound on the surface of the elastic fiber. Thus, the fibrous electrode may maintain its fiber shape, and an electrical connection structure in the carbon nanotube sheet may not be damaged by deformation of the elastic fiber. That is, the fibrous electrode may be reversibly changed to maintain excellent electrical conductivity.

In addition, the fibrous electrode according to the embodiments of the inventive concepts may have a fiber shape having a diameter of hundreds of micrometers, and thus the fibrous electrode may be light and may have excellent durability and excellent life span characteristics.

Furthermore, the fibrous electrode according to the embodiments of the inventive concepts may be capable of being variously deformed (e.g., bent or stretched) and of being realized in the form of textile. As a result, the fibrous electrode according to the embodiments of the inventive concepts may be applied to various electronic devices such as implantable medical devices, microelectronic devices, smart glasses, smart watches, wearable computers, and smart clothing.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A fibrous electrode comprising:
   an elastic fiber; and
   a carbon nanotube sheet that is formed on a surface of the elastic fiber and has at least one layer,
   wherein the carbon nanotube sheet is spirally wound around on the surface of the elastic fiber in such a way that each turn of the carbon nanotube sheet partially overlaps with adjoining turns of the carbon nanotube sheet, without tensile force,
   wherein the carbon nanotube sheet is arranged to have a certain bias angle with respect to an axial direction of the elastic fiber without tensile force, and
   wherein the certain bias angle is decreased when tensile force is applied to the fibrous electrode, and the certain bias angle is increased when tensile force is removed.

2. The fibrous electrode of claim 1, wherein the carbon nanotube sheet is formed by uniaxially aligning at least one or more carbon nanotubes.

3. The fibrous electrode of claim 1, wherein the certain bias angle ranges from 75 degrees to 85 degrees.

4. The fibrous electrode of claim 1, wherein a width of portions of the carbon nanotube sheet overlapped with the adjoining turn of the carbon nanotube sheet ranges from 0.1 times to 0.9 times a width of the carbon nanotube sheet.

5. The fibrous electrode of claim 1, wherein the carbon nanotube sheet has a plurality of pores.

6. The fibrous electrode of claim 1, further comprising:
   an electrode active material on a surface of the carbon nanotube sheet.

7. The fibrous electrode of claim 6, wherein the electrode active material is an oxide (MeOx) including one metal (Me) selected from a group consisting of Si, Sn, Li, Al, Ag, Bi, In, Ge, Pb, Pt, Ti, Zn, Mg, Mn, Cd, Ce, Cu, Co, Ni, and Fe or is one conductive polymer selected from a group consisting of poly(3,4-ethylenedioxythiophene), polyaniline, and polypyrrole.

8. The fibrous electrode of claim 1, wherein the fibrous electrode has an elastic strain of 100% to 300%.

9. A supercapacitor comprising at least one fibrous electrode of claim 1.

10. The supercapacitor of claim 9, wherein an electrical capacity per unit length of the supercapacitor ranges from 0.1 mF/cm to 5 mF/cm.

* * * * *